United States Patent

Boore et al.

[15] 3,636,755
[45] Jan. 25, 1972

[54] TESTING BOND STRENGTH OF SEMICONDUCTOR DEVICE ASSEMBLIES

[72] Inventors: Edward Joseph Boore, Allentown; Delos Mason Sutter, Lenhartsville, both of Pa.

[73] Assignee: Bell Telephone Laboratories, Incorporated, Murray Hill, N.J.

[22] Filed: June 4, 1970

[21] Appl. No.: 43,351

[52] U.S. Cl. .............................................73/37, 324/158 R
[51] Int. Cl. ......................................................G01n 19/04
[58] Field of Search ....................................73/37; 33/DIG. 2

[56] References Cited

UNITED STATES PATENTS

| | | | |
|---|---|---|---|
| 2,646,716 | 7/1953 | Bowen | 73/37 UX |
| 3,371,780 | 3/1968 | Clark | 73/37 X |
| 3,559,054 | 1/1971 | Bowers | 73/37 X |
| 3,413,839 | 12/1968 | Clark et al. | 73/37 |

Primary Examiner—Louis R. Prince
Assistant Examiner—William A. Henry, II
Attorney—R. J. Guenther and Edwin B. Cave

[57] ABSTRACT

A test method and apparatus for stressing beams leaded semiconductor device structures bonded to substrates is disclosed. A diffuser in close proximity to the chip surface causes a lower pressure on top of the chip than on the bottom because of gas flow out of the diffuser from the enclosing pressurized chamber. This creates a net force on the chip tending to lift it from the substrate. Varying the space between the chip and diffuser surfaces allows stepless control of the stress level applied to the chip, analogous to centrifuging. The force applied to the chip is typically increased to a predetermined value which is defined, using an established calibration technique, by the chamber pressure and the gas flow rate. However, forces great enough to remove the chip from the substrate may be generated if desired. This test method is also suitable for stressing a plurality of chips simultaneously.

8 Claims, 5 Drawing Figures

INVENTORS
E. J. BOORE
D. M. SUTTER
BY
ATTORNEY

TESTING BOND STRENGTH OF SEMICONDUCTOR DEVICE ASSEMBLIES

GOVERNMENT CONTACT

The work described herein was done in the performance of a contract with the Department of the Army.

BACKGROUND OF THE INVENTION

This invention relates to the testing of semiconductor device assemblies and particularly to the stress testing of bonded semiconductor chips mounted on substrates.

It has been standard practice to apply a mechanical stress to assembled semiconductor devices in order to measure the mechanical strength of the various elements of the assembly. In particular, a standard technique for this purpose is by centrifuging assemblies at levels of approximately several hundred times the force of gravity, that is, several hundred g's. This type of testing is completely satisfactory for semiconductor devices involving wire bonds, where fine wires are bonded by thermal or ultrasonic means to plated areas on semiconductor bodies or on substrates. Centrifuging is an advantageous technique in that an increasing stress is applied in a stepless fashion by means which do not involve direct contact with the semiconductor device or the introduction of a contaminating ambient to accomplish the test.

However, semiconductor device assemblies of the more recent art, both of discrete devices as well as integrated circuit devices, use more massive and rigid interconnecting means than the wire bonding techniques used heretofore. In particular, semiconductor chips containing one or more elements now are bonded to headers or substrates by beam leads or by metal protuberances such as solder balls. It is desirable to apply a mechanical stress in similar fashion to these assemblies; however, the centrifuging technique is impractical inasmuch as forces of the order of 100,000 times gravity are required to produce significant stress. Accordingly, a stepless application of stress which does not require contacting or occasion contamination of the semiconductor device assembly is desired.

SUMMARY OF THE INVENTION

In accordance with this invention a stepless stress is applied to a bonded semiconductor device of the beam lead or flip-chip type by apparatus which develops a differential gas pressure between the upper and lower major surfaces of the bonded semiconductor chip. The technique is applicable to any massively bonded semiconductor chip or electronic component having a void or clearance space between the underside of the chip and the mounting substrate. In accordance with the invention a constant gas pressure, greater than atmospheric, is applied to the bonded semiconductor chip. An exhaust diffuser, in effect a reverse nozzle, is gradually moved into proximity with the top surface of the semiconductor chip. As the diffuser moves closer to the wafer surface the gas flow across the chip surface and into the diffuser is constrained so that its velocity increases with a consequent drop in pressure in that region. This drop in pressure is accompanied by a proportional reduction in the volume rate of flow due to the reduction in flow area. The exhaust diffuser is connected to an ambient at a pressure significantly below the constant pressure applied to the device assembly. Typically, the exhaust diffuser is connected to the atmosphere.

Thus, as the diffuser approaches the semiconductor surface more closely the pressure in the zone adjacent the upper surface decreases and the pressure differential between the under surface and the top surface increases. Thus, an increasing force substantially equal to this pressure differential times the wafer surface area tends to lift the chip from the substrate to which it is bonded, and thus stresses both the bonded interconnections and the chip structure itself.

Advantageously, the pressure is applied using dry, filtered gas thereby reducing the possibility of contamination and furthermore, the pressure is developed in a stepless fashion without contacting the semiconductor device assembly. Most advantageously, electrical tests are applied during or immediately after the application of mechanical stress in order to detect mechanical failures induced by such testing. The entire procedure may be arranged for automatic or semiautomatic operation at a relatively high rate thus enabling testing of the total production if desired.

BRIEF DESCRIPTION OF THE DRAWING

The invention will be more completely understood from the following detailed description taken in conjunction with the drawing in which.

DETAILED DESCRIPTION

Figure 1:
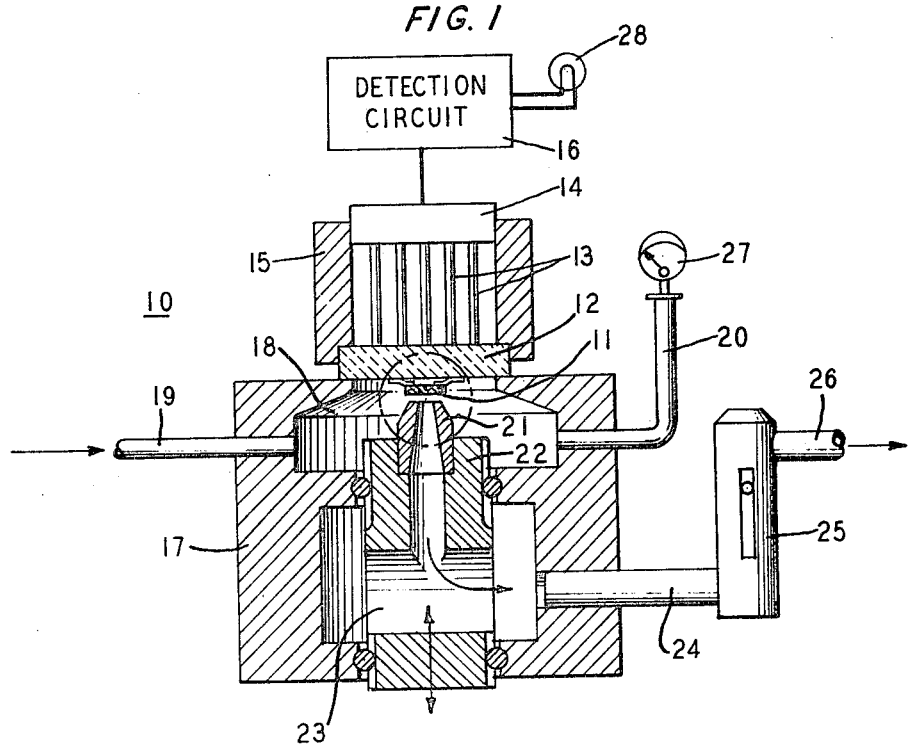
FIG. 1 is a schematic view, partially in section, of apparatus for carrying out the differential pressure test in accordance with this invention.

An embodiment of the invention is shown in the schematic view of FIG. 1. For clarity of illustration, various portions of the assembly are not to scale actually or from a relative standpoint. For example, the semiconductor device assembly, including the mounting substrate and leads, are greatly enlarged with respect to other portions of the testing apparatus. In the Figure, the semiconductor element 11 is shown bonded to a mounting substrate or header 12 to form an assembly having a plurality of external leads 13. This assembly is mounted upside down in a socket 14 and a holding fixture 15, which is connected electrically to testing apparatus and is indicated by the block 16 labeled detector circuit, and having a visual indicator 28, such as a test lamp.

Below the semiconductor device assembly is a series of pressure chambers 18, 23 formed within a suitable pressure housing 17. The upper chamber 18 immediately surrounds the bonded semiconductor chip 11 and is connected through inlet 19 to a source of dry, filtered gas, such as nitrogen, at suitable pressures, typically in the range from 100 to 300 pounds per square inch, gauge, capable of maintaining chamber 18 at the desired pressure with continuous exhaust flow out of the diffuser. Another connection 20 is provided for a pressure gauge 27 for observing the applied pressure to this chamber 18. A second chamber 23 below the first provides an exhaust from the first chamber by way of the diffuser 21 and chamber 22 which occupy a portion of this chamber 23. The exhaust chamber 23 is provided with an exhaust connection 24 including a flowmeter 25 for observing this important parameter of the test procedure.

The exhaust diffuser 22 comprises, in effect, a reverse nozzle 21 enabling flow from the pressure chamber 18 to the atmosphere by way of the exhaust chamber 23, outlet 24, flowmeter 25 and atmospheric connection 26. The diffuser 22 may be of circular or other cross section having a major axis for flow substantially perpendicular to the face of the semiconductor wafer. By means not shown the assembly to which the diffuser is mounted may be moved in a controlled fashion in a direction parallel to this major axis as indicated by the double ended arrow. Such motion varies the clearance between the tip of the exhaust diffuser and the surface of the semiconductor chip. It is this change in clearance which alters the pressure on the upper face of the chip and thus provides increasing differential pressure upon the semiconductor chip tending to lift the chip away from the substrate.

Figure 2:
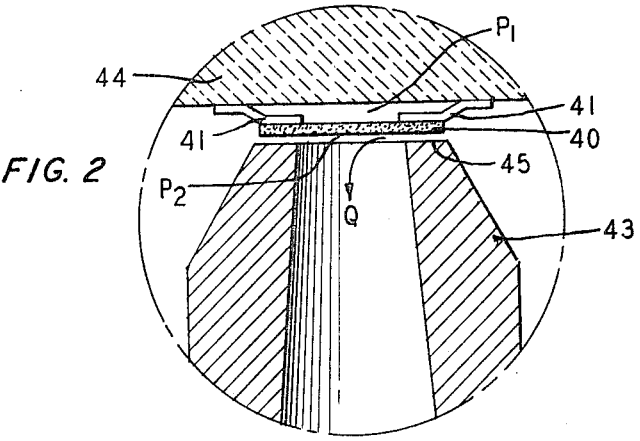
FIG. 2 is an enlarged view of the exhaust diffuser tip and a mounted semiconductor wafer for illustrating the pressure and flow relationships.

FIG. 2 is an enlargement of the circled portion of FIG. 1 showing in greater detail the bonded semiconductor device and the diffuser tip. In this detailed figure, the semiconductor chip 40 is shown secured to the ceramic substrate 44 by means of an array of metallic beam leads 41. Immediately above the upper surface of the wafer is the exhaust diffuser tip 43 configured so as to encompass the chip outline. As set forth above, the enclosure is subjected to a substantially constant gas pressure $P_1$, and this pressure initially exists on both sides of the semiconductor chip 40.

When the clearance between the surface 45 of the diffuser 43 and the top surface of the chip is large, typically greater than 15 mils for chips in the range of from 10–100 mils on a side, gas flows out of the diffuser at a rate Q with little or no constraint. Under these conditions the pressure $P_2$ on the upper face of a chip is substantially equal to $P_1$. As the clearance between diffuser and chip surface decreases, typically down to about 10 mils, pressure $P_1$ remains constant on the underside of the wafer but pressure $P_2$ on the upper face, that is, the face away from the substrate of the wafer decreases because of the conversion of pressure to velocity in the increasingly constrained exhausting gas. The pressure $P_2$ depends not only on the clearance determination but also upon the geometry of the chip and the diffuser.

At any rate, as $P_2$ decreases, a net upward force is developed which is the product of the difference in pressures $P_1$ and $P_2$, times the surface area of the chip. This is the force tending to lift the chip from the substrate, and forces sufficient to separate the bonds, or fracture the semiconductor chip where defects exist, can be developed.

As a criterion, using a mechanical arrangement to apply a static load on bonded semiconductor chips in the direction to force the chips away from their substrates, it has been determined that a stress level specification of 1.5 lbs. per inch of total beam lead width is suitable. That is, the applied stress in pounds force is equal to the sum of the beam lead widths on the semiconductor chip in inches multiplied by 1.5. In the apparatus of FIG. 1 the pressure differential may be determined from the flow rate Q in order to secure a measure of the applied force for a particular semiconductor chip-diffuser configuration. This then is translated to the specified test force requirement by referring to calibration curves obtained using the apparatus of FIG. 4 to provide the relationship between the pressure differential $(P_1-P_2)$ and the exhaust flow rate, as described hereinafter.

In a typical test procedure an operator may manually control the movement of the exhaust diffuser within particular limits while using the flowmeter as a monitor for the operation. Once the specified stress has been applied, the electrical test equipment is activated to determine the existence of defects such as upon circuits or short circuits. Obviously, the arrangement may be converted to an automatic test operation.

Figure 3:
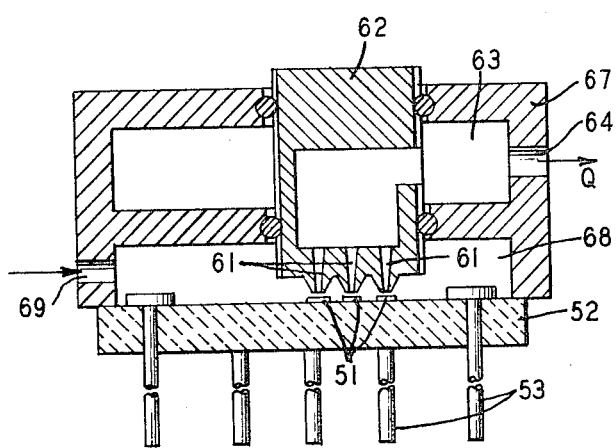
FIG. 3 is a more simplified schematic view, in section, of apparatus for testing a plurality of devices simultaneously.

Referring to FIG. 3, in the case of semiconductor device assemblies in which many or all of the semiconductor chips are of the same size, but not necessarily limited to the same size, an entire array may be tested simultaneously in the arrangement depicted in the schematic drawing of FIG. 3. The substrate 52 having connecting leads 53 carries an array of semiconductor chips 51. Pressure chambers 68 and 63 with inlet 69 and outlet 64 are similar in function to the apparatus previously described. However, the diffuser assembly 62 carries an array of exhaust nozzles 61 each arranged in juxtaposition to a single semiconductor chip 51. Inasmuch as the chips are usually of substantially the same area and beam lead width, the same stress is applied to all wafers and if all diffusers are of the same shape and length a simultaneous test may be applied. In this case the appropriate stress is determined by relating the total flow rate and the number of chips under test to the flow rate for a single chip. For chips of different configuration on the same substrate the simultaneous stressing of multiple chips requires either varying the diffuser lengths or controlling the exhaust pressure on individual diffusers.

Figure 4:
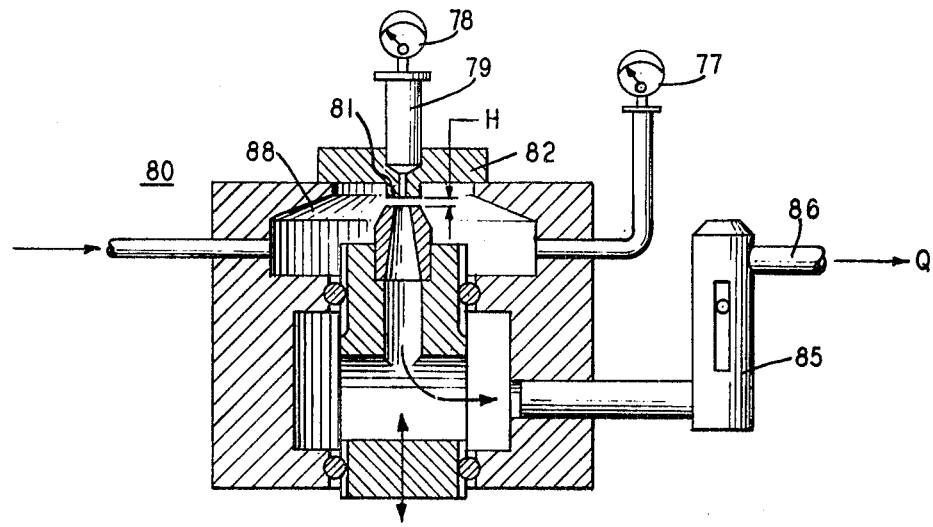
FIG. 4 is a schematic view, partially in section, of apparatus for determining the desired test conditions and establishing the correlation between the applied stress and measurable parameters.

To define the test conditions corresponding to a finite stress on the semiconductor chip an indirect calibration is made. Referring to FIG. 4, this calibration utilizes apparatus 80 similar in general arrangement to that already described in connection with FIG. 1. In place of the header and semiconductor assembly there is mounted a test substrate 82 with a raised section 81 simulating the semiconductor chip outline and containing a centrally located passage 79 connected to an external pressure gauge 78. This enables direct measurement of pressure $P_2$ under simulated test conditions. As in the apparatus previously described gauge 77 enables measurement of pressure $P_1$ in the chamber 88 and flowmeter 85 enables measurement of the flow rate Q emitting from the exhaust connection 86.

Inasmuch as both the flow rate Q and pressure $P_2$ are proportional to the diffuser-to-chip spacing H, a correlation between the differential pressure $(P_1-P_2)$ and the flow rate Q can be established for any given chip and diffuser combination at a fixed chamber pressure $P_1$. Thus, the desired stress can be applied to the chip by monitoring the exhaust flow as the diffuser-to-chip spacing H is reduced, stopping when the predetermined flow rate has been attained, at a constant chamber pressure $P_1$.

Figure 5:
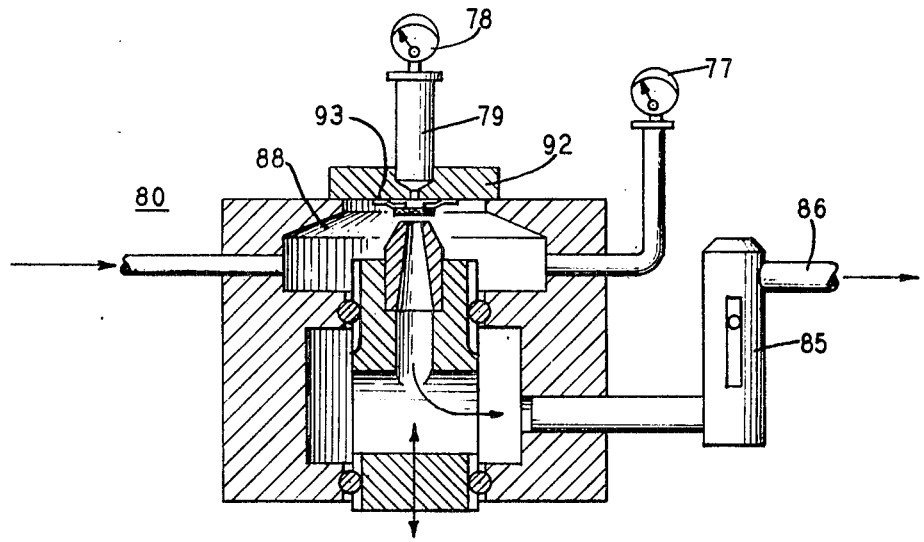
FIG. 5 is a schematic view, partially in section, of the apparatus for measuring the pressure under the semiconductor chip.

As shown in FIG. 5, the same apparatus 80 may be used to confirm that the pressure $P_1$ is maintained under a semiconductor chip during the differential pressure test. For this purpose a special header 92 containing a pressure passage 79 is provided to mount a semiconductor chip 93 in bonded configuration. This apparatus is otherwise similar to that already described in connection with FIG. 4 and pressure gauge 78 will indicate the pressure under the chip during the test.

The geometry of the tip of the exhaust diffuser is determined in part by the semiconductor wafer size and shape. In general, a diffuser for a square wafer will have a matching square external outline and a tapered circular hole as the exhaust passage. A diffuser having a rectangular wafer has a matching rectangular external outline and a tapered rectangular hole as the exhaust passage. It should be noted that in FIG. 1 the apparatus is arranged for exhaust gas flow downward through the diffuser whereas in the other two figures it is upward. This is simply for convenience of illustration and the apparatus is not limited to any particular orientation. In the case of multiple diffusers as shown in FIG. 3, the external shape of the diffuser, that is the external bevel, is significant with closely spaced diffusers. It is important to avoid interference of flow between the diffusers. To avoid flow constriction in the diffusers it has been found advantageous to use an 8° to 12° included angle on the interior surfaces of the diffusers.

Although the foregoing differential pressure test has been disclosed in terms of certain specific embodiments it is apparent that modifications may be made by those skilled in the art which will still fall within the scope and spirit of the invention as recited in the claims.

What is claimed is:

1. A method of applying stress to test a bonded semiconductor device comprising (a) placing the bonded semiconductor device in a pressure chamber, (b) applying and maintaining a substantially constant greater than atmospheric pressure in said chamber, (c) applying pressure reducing means to the top surface of said bonded semiconductor device, (d) thereby to produce a pressure differential between the top and bottom surfaces of said device.

2. The method in accordance with claim 1 in which said pressure reducing means comprises an exhaust diffuser connected to a region at a pressure less than said greater than atmospheric pressure.

3. The method in accordance with claim 2 in which said exhaust diffuser is moved toward said top surface of said semiconductor device thereby to increase the pressure differential between the top and bottom surfaces of said device.

4. The method in accordance with claim 3 in which said semiconductor device is tested electrically during the application of stress.

5. Apparatus for applying stress to a bonded semiconductor device comprising (a) a pressure chamber including means for mounting a bonded semiconductor device, (b) means for maintaining a substantially constant pressure $P_1$ in said pressure chamber, (c) an exhaust diffuser in juxtaposition to the upper face of said mounted semiconductor device for producing a reduced pressure over said upper face.

6. Apparatus in accordance with claim 5 in which said exhaust diffuser has an exhaust passage whose axis is substantially perpendicular to the plane of the upper face of said mounted semiconductor device.

7. Apparatus in accordance with claim 6 in which the exhaust diffuser is movable relative to said mounted semiconductor device in a direction substantially parallel to said exhaust passage axis and thus toward and away from said upper face.

8. Apparatus in accordance with claim 7 including means connecting said exhaust diffuser at an end away from said semiconductor device to the atmosphere.

* * * * *